(12) United States Patent
Joos et al.

(10) Patent No.: US 6,398,491 B1
(45) Date of Patent: Jun. 4, 2002

(54) MULTISTAGE TURBOCOMPRESSOR

(75) Inventors: Franz Joos, Weiheim-Bannholz (DE); Uy-Liem Nguyen, Baden-Dättwil; Ulrich Waltke, Neuenhof, both of (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/510,355

(22) Filed: Feb. 22, 2000

(30) Foreign Application Priority Data

Feb. 24, 1999 (DE) ........................... 199 07 907

(51) Int. Cl.$^7$ ............................................. F01D 17/00
(52) U.S. Cl. ................. 415/145; 415/149.2; 415/160; 415/162
(58) Field of Search ................. 415/145, 148, 415/149.2, 160, 162

(56) References Cited

U.S. PATENT DOCUMENTS

| | | | |
|---|---|---|---|
| 2,831,627 A | | 4/1958 | Brunner |
| 3,514,952 A | | 6/1970 | Schumacher et al. |
| 3,638,428 A | * | 2/1972 | Shipley et al. ............... 60/226 |
| 3,898,799 A | * | 8/1975 | Pollert et al. ............. 60/226 R |
| 3,945,759 A | * | 3/1976 | Bobo ......................... 415/145 |
| 5,231,825 A | | 8/1993 | Baughman et al. |
| 5,281,087 A | * | 1/1994 | Hines ........................ 415/160 |
| 5,327,716 A | | 7/1994 | Giffin, III et al. |

FOREIGN PATENT DOCUMENTS

| | | |
|---|---|---|
| DE | 26 18 727 | 11/1976 |
| DE | 28 34 822 | 2/1980 |
| DE | 33 33 437 | 4/1985 |
| DE | 35 14 354 | 10/1986 |
| DE | 36 24 951 | 10/1987 |
| GB | 2 230 822 A | 10/1990 |

OTHER PUBLICATIONS

The United Kingdom Patent Office Search Report No. GB 0004301.8, Jul. 21, 2000, Rolls–Royce plc, *The Jet Engine*, Compressors, Typical Variable Stator Vanes, p. 29. (Undated).

Beitz et al., "Dubbel, Taschenbuch für den Maschinenbau", (Mechanical Engineering Manual) 14th Ed., 1981, pp. 877–878.

Traupel, "Thermische Turbomaschinen", (Thermal Turbo-machines) 3rd Ed., 1982, vol. 2, pp. 111–114.

Neuhoff et al., "Die neuen Gasturbinen GT24 und GT26— hohe Wirkungsgrade dank sequentieller Verbrennung", *ABB Technik* 2, 1994, pp. 4–7.

* cited by examiner

*Primary Examiner*—Edward K. Look
*Assistant Examiner*—Ninh Nguyen
(74) *Attorney, Agent, or Firm*—Burns, Doane, Swecker & Mathis, L.L.P.

(57) ABSTRACT

A multistage turbocompressor is equipped with a tapping point between two compressor stages. The guide-blade cascade of the stage arranged directly upstream or downstream of the tapping point is designed with adjustable geometry. The pressure at the tapping point can be set within wide limits, irrespective of the compressor operating point, by an adjustment of this guide-blade cascade.

11 Claims, 1 Drawing Sheet

MULTISTAGE TURBOCOMPRESSOR

BACKGROUND OF THE INVENTION

The present invention relates to a multistage turbocompressor which, when in operation, conveys a medium from an inlet pressure to an outlet pressure, including, in each case, a plurality of guide-blade cascades and moving-blade cascades which are arranged alternately in the conveying direction, in such a way that, in each case, a moving-blade cascade forms, with a guide-blade cascade following it in the conveying direction, a compressor stage, the moving-blade cascades being arranged on a rotor and the guide-blade cascades on a stator, said turbocompressor having at least one tapping point for at least one further pressure which is between the inlet pressure and the outlet pressure, at which tapping point a part stream of a partly compressed medium is extracted, to a extracted. The invention also relates method for operating a turbocompressor.

A highly efficient method for regulating turbocompressors involves adjusting the guide-blade cascade of one or more stages (Dubbel, Taschenbuch fur den Maschinenbau [Mechanical Engineering Manual], $14^{th}$ edition 1981 pp 877; Traupel, Thermische Turbomaschinen [Thermal Turbomachines], $3^{rd}$ Ed. 1982, Vol. 2, pp 111). This regulating method has been employed for a long time, particularly in the case of machines which have to cover a large rotational speed range: in aircraft engines, it is perfectly possible for half the compressor stages to be equipped with adjustable guide-blade cascades. Even with regard to stationary gas turbines of the latest generation, development tends toward designing a plurality of compressor stages with adjustable geometry, as described, for example, in ABB Technology 2/1994, pp 4.

Multistage turbocompressors, precisely those used in gas turbines, have tapping points for extracting compressor air at one or more pressures, the tapping pressure being between the inlet pressure and the outlet pressure. The auxiliary air required at the tapping points is usually needed at a very high pressure level, for example in order to cool the turbine components. The tapping points are therefore mostly located in the rear stages of a compressor. The tapping pressure is thus predetermined essentially by the compressor operating pressure. On the one hand, it is invariable in the case of a specific compressor outlet pressure, and, on the other hand, it varies directly with the operating point of the compressor.

With the turbocompressors customary at the present time and the methods for operating them, it is therefore not possible to provide a defined tapping pressure, irrespective of the operating point of the turbocompressor.

SUMMARY OF THE INVENTION

The invention, then, intends to remedy this. The object of the invention, therefore, in a multistage turbocompressor which, when in operation, conveys a medium from an inlet pressure to an outlet pressure, including, in each case, a plurality of guide-blade cascades and moving-blade cascades which are arranged alternately in the conveying direction, in such a way that, in each case, a moving-blade cascade forms, with a guide-blade cascade following it in the conveying direction, a compressor stage, the moving-blade cascades being arranged on a rotor and the guide-blade cascades in a stator, said turbocompressor having at least one tapping point for at least one further pressure which is between the inlet pressure and the outlet pressure, at which tapping point a part stream of a partly compressed medium is extracted, is to provide a possibility for setting the tapping pressure within a wide range, irrespective of the operating point of the compressor.

This is achieved, according to the invention, in that the guide-blade cascade of the stage located immediately upstream of the tapping point and/or of at least one stage arranged downstream of the tapping point is designed with adjustable geometry.

As mentioned initially, in turbocompressors operating over a relatively wide rotational speed range, for adapting the stage kinematics it is perfectly normal to design a relatively large number of moving-blade cascades so as to be adjustable. Here, however, the adjustment of the row of guide blades in connection with the invention serves for controlling the pressure at a specific point in the compressor, irrespective of the compressor operating point. It is therefore expedient and desirable to use the subject of the invention even in compressors which are provided for operating at a constant rotational speed.

By virtue of this design, it is possible for the compressor to have an operating mode in which the work output of the compressor is shifted into the front or the rear compressor stages as a function of the requirements of the tapping point and of the operating point of the compressor.

DETAILED DESCRIPTION OF PREFERRED EMBODIMENTS

Figure 1:
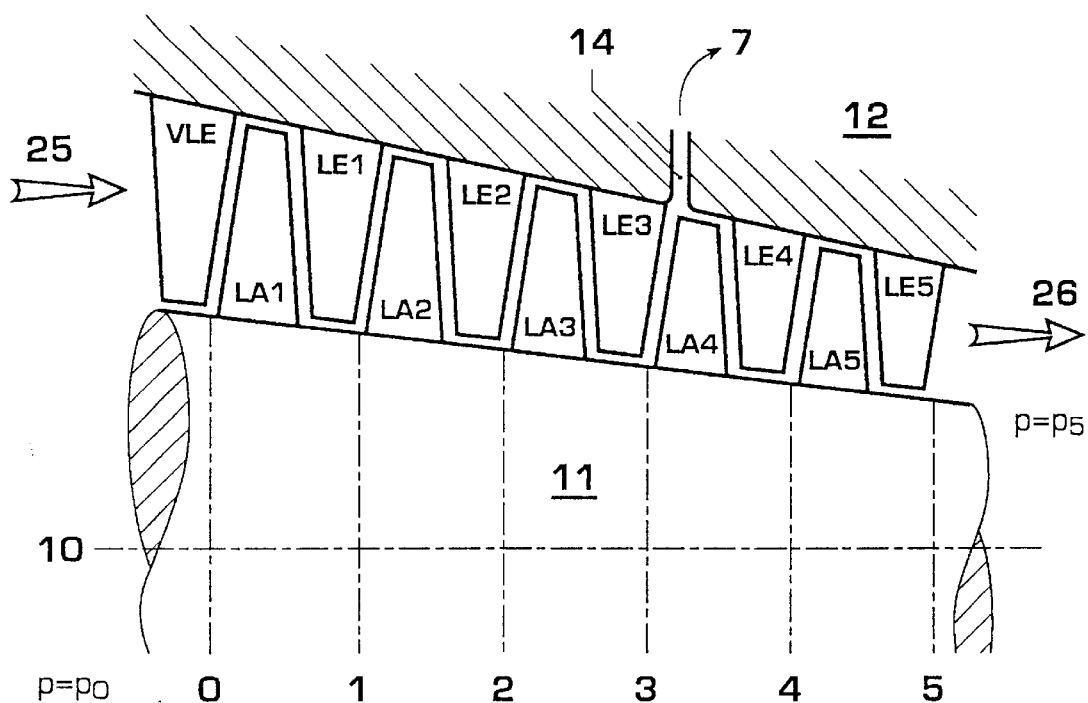
FIG. 1 shows by way of example a five-stage axial compressor with an intermediate tapping point after the third compressor stage.

FIG. 1 illustrates by way of example an axial compressor which conveys a medium 25, 26 in the direction of the arrow from a pressure $p=p_0$ to a pressure $p=p_5$. The compressor moving-blade cascades LA1, LA2, LA3, LA4, LA5 are arranged on a shaft 11 of the compressor and rotate together with the shaft about a machine axis 10. Each moving-blade cascade is followed in the direction of flow by a guide-blade cascade LE1, LE2, LE3, LE4, LE5 which is fastened in the housing 12. Each of the compressor moving-blade cascades LA1, LA2, LA3, LA4, and LA5, and each immediately adjacent (in the direction of flow) corresponding guide-blade cascades LE1, LE2, LE3, LE4, and LE5, respectively, constitute a compressor stage 16. The compressor illustrated is equipped, furthermore, with an adjustable preguide-blade row VLE which determines essentially the inlet volume flow of the compressor.

The five-stage axial compressor illustrated should in no way be interpreted here in a restrictive sense, specifically, in particular, not in terms of the number of stages and the design. An axial compressor as an integral part of a gas turbine plant has, in general, many more stages. On the other hand, the idea of the invention can also be implemented, for example, in radial compressors or in compressors which have both axial and radial stages or stages through which the flow passes diagonally. Nor is the preguide-blade row any more mandatory.

The operating point of the compressor, in particular the pressure $p_5$, is predetermined by a consumer arranged downstream of the last compressor stage 16 and of the level 5, whilst the pressure $p_0$ corresponds essentially to ambient pressure. If the compressor stages have a given geometry, the pressure at the levels 1, 2, 3, 4 within the compressor is determined by the inlet and outlet pressure and the volume flow.

Furthermore, in the compressor illustrated, a tapping point 14 is provided in the housing 12, a quantity of partly compressed medium 14 being extracted through said tapping point downstream of the third compressor stage LA3, LE3. This may be, for example, cooling air which, in a gas turbine plant, is supplied at a point of suitable pressure to the flow in the thermally highly loaded turbine.

Figure 2:
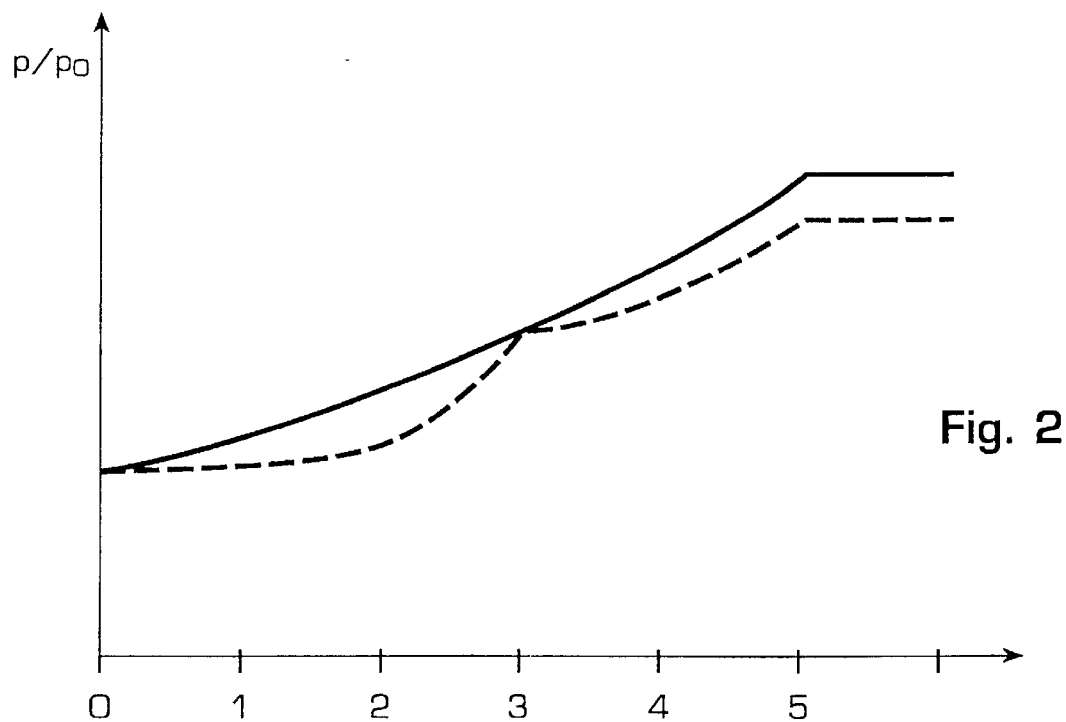
FIG. 2 illustrates the pressure profile in this compressor at two operating points in the design and operating mode according to the invention.

The unbroken line in FIG. 2 shows diagrammatically the pressure profile in the direction of flow of the compressor at the design operating point, on the assumption that all the compressor stages have an identical pressure ratio.

If the compressor outlet pressure falls, then, the pressure at any of the intermediate levels of the compressor likewise falls, of course, that is to say also the pressure at the tapping point 14 at level 3. If this pressure is to be kept constant, the compressor characteristic map must be changed for this purpose, and this may be carried out, in particular, by changing the compressor stage geometry. As mentioned initially, adjustable compressor guide-blade cascades are known. As likewise mentioned, their use is restricted to the front compressor stages, where they serve for adapting the characteristic map of the compressor to that of the consumer, or as a preguide-blade row for controlling the inlet volume flow.

In a turbocompressor according to the invention, then, guide-blade cascades immediately adjacent to the tapping point are designed adjustably, in order to act as directly as possible on the available tapping pressure. In the exemplary embodiment, for example, the guide blades LE3 will be assumed to be adjustable, and, with a falling compressor outlet pressure, the geometry of the guide-blade cascade can then be changed in such a way that the enthalpy rate, and therefore the pressure build-up, in the third compressor stage rises, as compared with the other stages. This results in the pressure profile depicted by a broken line: when the compressor outlet pressure falls, the tapping pressure at level 3 can be kept constant.

The adjustment of the guide-blade row LE3 may, of course, also be used to reduce the pressure build-up in the third compressor stage in the event of an increase in the compressor outlet pressure and to keep the tapping pressure constant. The adjustment of the guide-blade cascade may likewise also be utilized in order, when the compressor operates under conditions which are constant overall, to adapt the pressure at the tapping point 14 to the variable requirements of a consumer connected there.

It is, of course, also possible to carry out pressure adaption by adjusting the guide-blade cascade of the compressor stage located immediately downstream of the tapping point, LE4 in the exemplary embodiment.

What is claimed is:

1. A multistage turbocompressor for conveying a medium from an inlet pressure to an outlet pressure comprising:
    a housing;
    a rotor;
    a plurality of guide-blade cascades arranged in the housing, at least one of the plurality of guide-blade cascades having an adjustable geometry, and a plurality of moving-blade cascades arranged on the rotor alternately in the conveying direction, such that each one of the plurality of moving-blade cascades is immediately adjacent to one of the plurality of guide-blade cascades in the conveying direction, and each forms one of a plurality of compressor stages;
    at least one tapping point, the at least one tapping point capable of extracting a part stream of a partly compressed medium and capable of conveying the part stream at a further pressure, the further pressure being between an inlet pressure and an outlet pressure, the at least one tapping point positioned for extracting at least one medium from the group consisting of auxiliary air, cooling air, and both;
    wherein the turbocompressor is a turbocompressor for operating at a constant operational speed;
    wherein the at least one adjustable geometry guide-blade cascade is located at a position selected from the group consisting of immediately upstream of the at least one tapping point and downstream of the at least one tapping point;
    wherein the compressor stage including the at least one adjustable geometry guide-blade cascade is located immediately adjacent to a first one of the at least one tapping point, one of the plurality of compressor stages being located on the upstream side of the first one of the at least one tapping point, and a second one of the plurality of compressor stages being located on the downstream side of the first one of the at least one tapping points.

2. The multistage turbocompressor of claim 1, wherein the at least one adjustable geometry guide-blade cascade is located immediately upstream of the at least one tapping point.

3. The multistage turbocompressor of claim 1, wherein the at least one adjustable geometry guide-blade cascade is located downstream of the at least one tapping point.

4. The multistage turbocompressor of claim 1, wherein the at least one tapping point is located in the front compressor stages.

5. The multistage turbocompressor of claim 1, wherein the at least one tapping point is located in a position other than in the front compressor stages.

6. A method for operating the multistage turbocompressor of claim 1, comprising the step of: adjusting the at least one adjustable geometry guide-blade cascade to vary a pressure at the tapping point, the adjusting step being performed irrespective of an inlet and an outlet pressure and of an inlet volume flow of the conveyed medium and while the turbocompressor is operated at a constant rotational speed.

7. A method for operating the multistage turbocompressor of claim 1, comprising the step of: adjusting the at least one adjustable geometry guide-blade cascade to maintain constant pressure at the tapping point, the adjusting step being performed irrespective of an inlet and an outlet pressure and of an inlet volume flow of the conveyed medium.

8. A method in accordance with claim 7, wherein the step of adjusting is performed while the turbocompressor operates at a constant rotational speed.

9. A method for independently controlling the pressure of air selected from the group consisting of auxiliary air, cooling air, and both, from a tapping point of the multistage compressor of claim 1, comprising the step of: adjusting the at least one adjustable geometry guide-blade cascade to vary a pressure at the tapping point, the adjusting step being performed irrespective of an inlet and an outlet pressure and of an inlet volume flow of the conveyed medium.

10. A method for independently controlling the pressure of air selected from the group consisting of auxiliary air, cooling air, and both, from a tapping point of the multistage compressor of claim 1, comprising the step of: adjusting the at least one adjustable geometry guide-blade cascade to maintain constant pressure at the tapping point, the adjusting step being performed irrespective of an inlet and an outlet pressure and of an inlet volume flow of the conveyed medium.

11. The multistage turbocompressor of claim 1, wherein the at least one adjustable geometry guide-blade cascade comprises adjustable geometry guide-blade cascades located both immediately upstream of the at least one tapping point and immediately downstream of the at least one tapping point.

* * * * *